(12) United States Patent
Marimbordes et al.

(10) Patent No.: US 8,677,982 B2
(45) Date of Patent: Mar. 25, 2014

(54) EXHAUST GAS INLET DEVICE

(75) Inventors: Thierry Marimbordes, Bazougera (FR); Pascal Noiseau, Saint Ouen des Toits (FR)

(73) Assignee: Mann+Hummel GmbH, Ludwigsburg (DE)

( * ) Notice: Subject to any disclaimer, the term of this patent is extended or adjusted under 35 U.S.C. 154(b) by 1047 days.

(21) Appl. No.: 12/704,705

(22) Filed: Feb. 12, 2010

(65) Prior Publication Data

US 2010/0199663 A1    Aug. 12, 2010

(30) Foreign Application Priority Data

Feb. 12, 2009  (DE) ..................... 20 2009 001 782 U

(51) Int. Cl.
*F02B 33/00*    (2006.01)

(52) U.S. Cl.
USPC ............... 123/563; 123/568.12; 123/568.17; 123/568.18; 60/599; 60/605.2

(58) Field of Classification Search
USPC ................. 60/599, 605.2; 123/563, 568.16, 123/568.17, 568.18
See application file for complete search history.

(56) References Cited

U.S. PATENT DOCUMENTS 5,970,960 A * 10/1999 Azuma .................... 123/568.12
6,173,701 B1 * 1/2001 Azuma .................... 123/568.17
7,302,939 B2 * 12/2007 Hill et al. ................. 123/568.12
2008/0087402 A1 * 4/2008 Burk .............................. 165/101
2008/0149078 A1 * 6/2008 Hill et al. ................. 123/568.11
2010/0077996 A1 * 4/2010 Pantow et al. ................. 123/557
2010/0132346 A1 * 6/2010 Genoist et al. ................. 60/311
2011/0120430 A1 * 5/2011 Marimbordes et al. .. 123/568.12
2013/0032114 A1 * 2/2013 Marimbordes et al. .. 123/184.47

FOREIGN PATENT DOCUMENTS

| EP | 1870591 A2 * | 12/2007 | ........... F02M 25/07 |
| FR | 2879262 A1 * | 6/2006 | ........... F02M 25/07 |
| FR | 2973445 * | 10/2012 | |
| JP | 2009092005 A * | 4/2009 | |
| JP | 2009185751 A * | 8/2009 | |
| WO | WO-2008116568 * | 10/2008 | |

OTHER PUBLICATIONS

Machine Translation of WO-2008116568, Machine Translated on May 28, 2013.*

* cited by examiner

*Primary Examiner* — Thomas Denion
*Assistant Examiner* — Patrick Maines
(74) *Attorney, Agent, or Firm* — James Hasselbeck

(57) ABSTRACT

An air intake tract arrangement for an internal combustion engine includes an exhaust gas inlet device arranged at the inlet side of a charge air cooler and configured to direct injected EGR exhaust gas substantially in a direction towards an inlet of said charge air cooler, thereby enabling the use of plastic intake tract components.

5 Claims, 4 Drawing Sheets

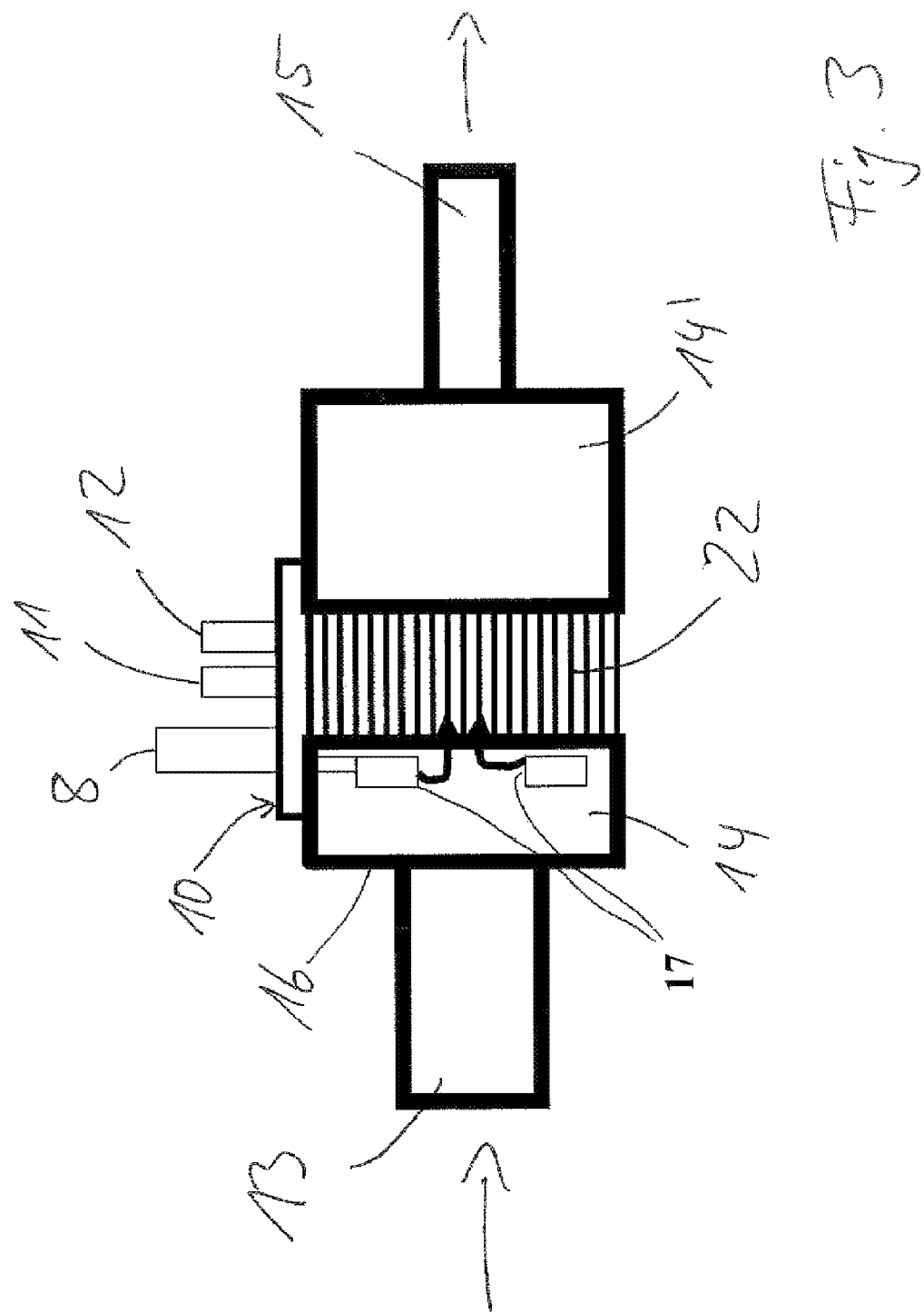

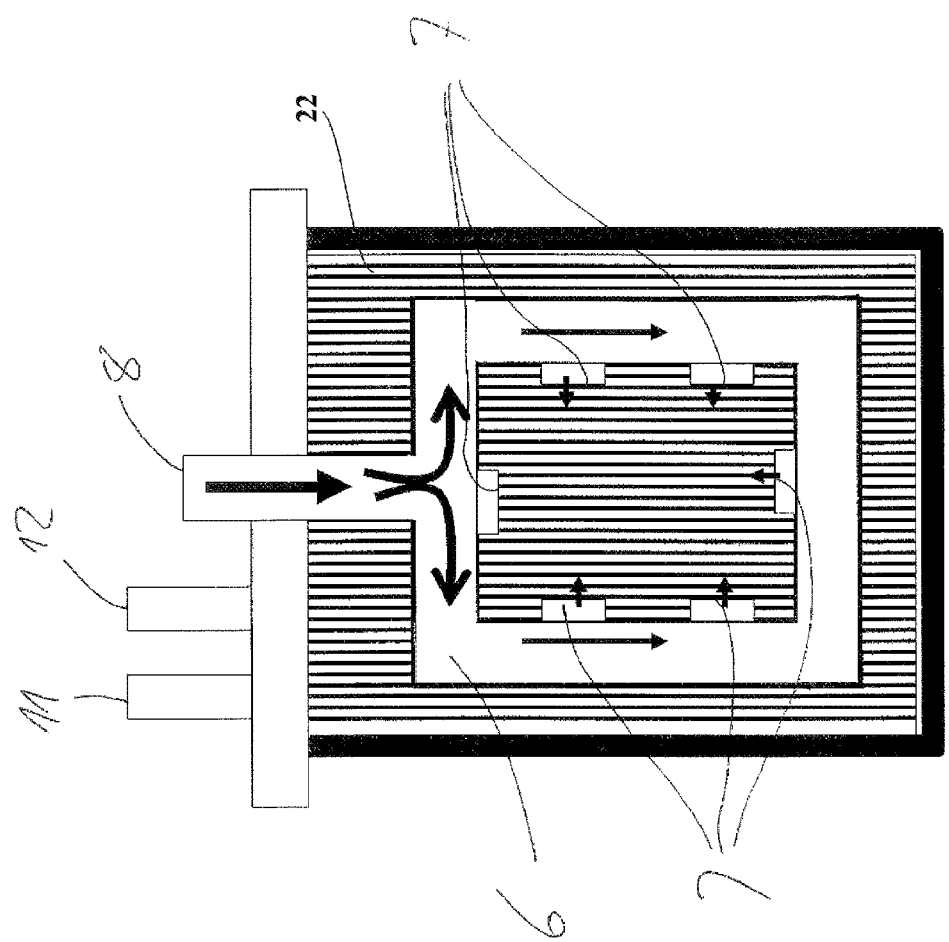

EXHAUST GAS INLET DEVICE

CROSS REFERENCE TO RELATED APPLICATIONS

Priority is claimed based on Federal Republic of Germany patent application no. DE 20 2009 001 782.6 filed Feb. 12, 2009.

TECHNICAL FIELD

The invention relates generally to an exhaust gas inlet device for an air intake tract of an internal combustion engine with an charge air cooler integrated into the air inlet manifold.

BACKGROUND OF THE INVENTION

Plastic intake ducts and manifolds for the intake air of a turbo charged combustion engine wherein the EGR (exhaust gas recirculation) inlet into the combustion air flow is situated downstream from the charged air cooler are known. For an example configuration, the EGR inlet is integrated into the plenum of the manifold instead of being upstream from the throttle body.

In another known configuration the EGR inlet is positioned upstream of the charge air cooler. At this location air coming from the turbo charger at a temperature above 150 degrees C. has to be mixed with exhaust gas entering the air intake line at temperatures up to 700 degrees C. This mixing creates a flow at a temperature that could exceed the maximum acceptable temperature for plastics. Thus the parts of the intake tract around this mixing zone are required to be made of metal.

SUMMARY OF THE INVENTION

This invention enables the mixing of exhaust gas and combustion air from the turbo charger in a location upstream from the charge air cooler in an intake manifold made substantially of plastic material. Both or either of the intake manifold and/or the air ducts can be made substantially out of the plastic material.

To provide an air intake tract substantially made of plastic material the EGR injection is included in or located close to the charge air cooler module.

Preferably the inlet device injects the EGR substantially in the direction of the flow of the combustion air at a position in front of the inlet side of the charge air cooler. Preferably the injection is positioned close to the charge air cooler. In this way exhaust flow can mix in a zone spatially separated from the plastic parts of the air intake tract, thus the walls are not heated by the exhaust gas. The hot mixed flow may be directed to enter the charge air cooler directly. The temperature of the mixed flow is higher directly in the mixing zone and cooler in the area close to the walls of the air intake tract. A homogenous mixing can be supported by a multi point injection. The inlet device could be a tube with several bores in the direction of the charge air cooler.

Preferably the EGR inlet device is entering the air intake tract through a cooled flange. The cooled flange is preferably cooled by the charge air cooler. The cooled flange can be constructed in one alternative as a part of the charge air cooler, e.g. as integral part of a charge air module. The cooled flange enables a hot EGR inlet device to be fixed to the air intake tract made substantially from a plastic material. The cooled flange reduces heating of the air intake tract, e.g. by heat conduction from a metal inlet device to the plastic air intake tract.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 3 shows a cross section through another embodiment of the EGR inlet device arranged within an air intake duct, consistent with the present invention; and FIG. 4 a side view of the module shown in FIG. 3.

Figure 1:
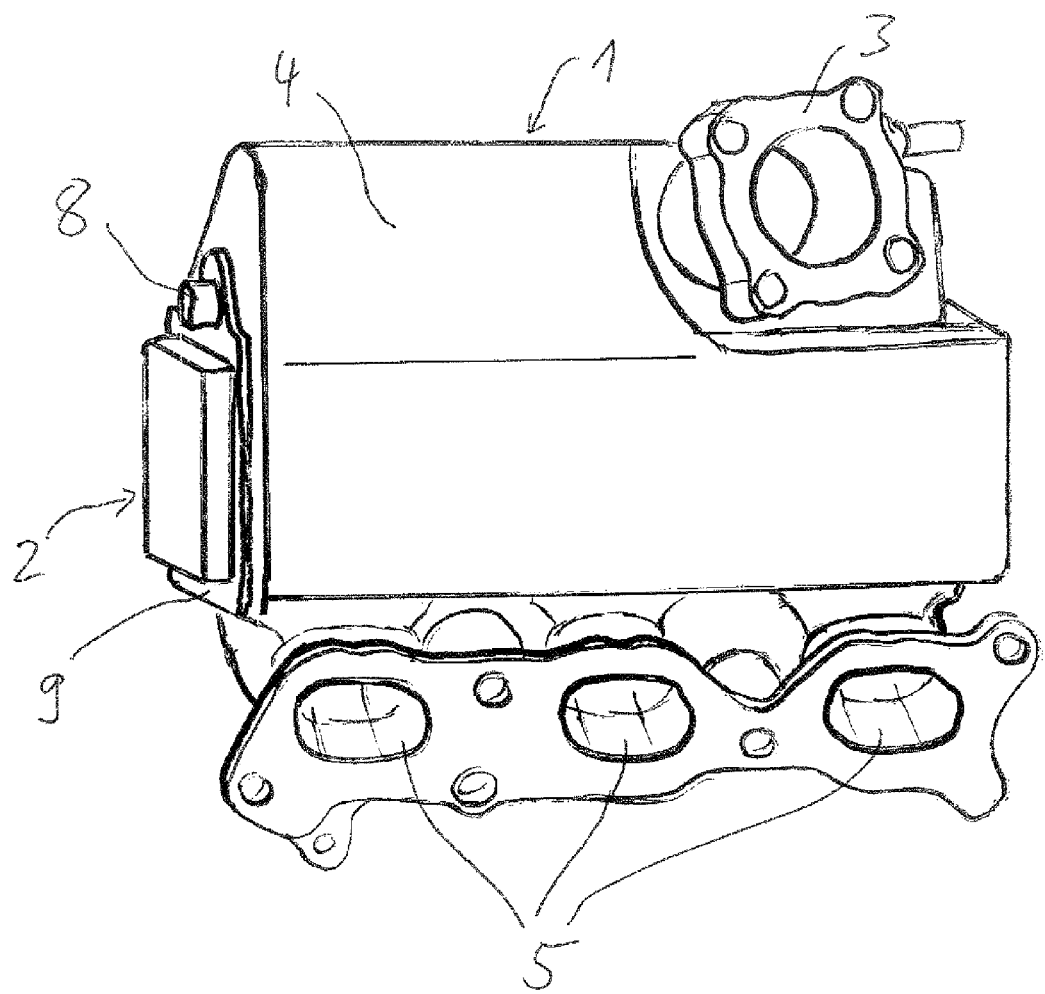
FIG. 1 depicts an air intake manifold of an internal combustion engine with an integrated water cooler to cool the charge air from a turbocharger, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to an exhaust gas inlet device for a internal combustion engine including an charge air cooler integrated into the engine air intake tract as disclosed herein. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 shows an air intake manifold 1 of an internal combustion engine with an integrated water cooler 2 to cool the charge air. The clean air for the combustion engine enters the manifold 1 at the air inlet flange 3 through a throttle body. The air enters the plenum 4 of the manifold 1 and flows through the cooler 2 through a second plenum 4' into the inlet ports 5 of the combustion engine. Inside the plenum 4 upstream the cooler 2 there is an EGR (exhaust gas recirculation) inlet device 6 with outlets 7 for the hot exhaust gas which directs the exhaust gas towards the cooler 2. On the outside of the EGR inlet device 6 there is a flange 9 providing an inlet port 8 for the exhaust gas and a connection to the exhaust gas system.

The air cooler can be made with a water circulation system transferring the heat of the exhaust gas and the fresh air through ribs to the water. Other possible alternative of air coolers are known to a person skilled in the art.

The EGR inlet device 6 can be made in one part with (integrated with) the air cooler 2 as a unitary module to reduce number of parts and assembly steps.

The module (EGR device 6+charge air cooler 2) can be slidably inserted into an opening at one side of the manifold 1 and configured such that the flange 9 closes the manifold at the mounting flange tightly after assembling.

In another advantageous solution the manifold 1 can be assembled of several parts with one part being the air cooler 2.

Figure 2:
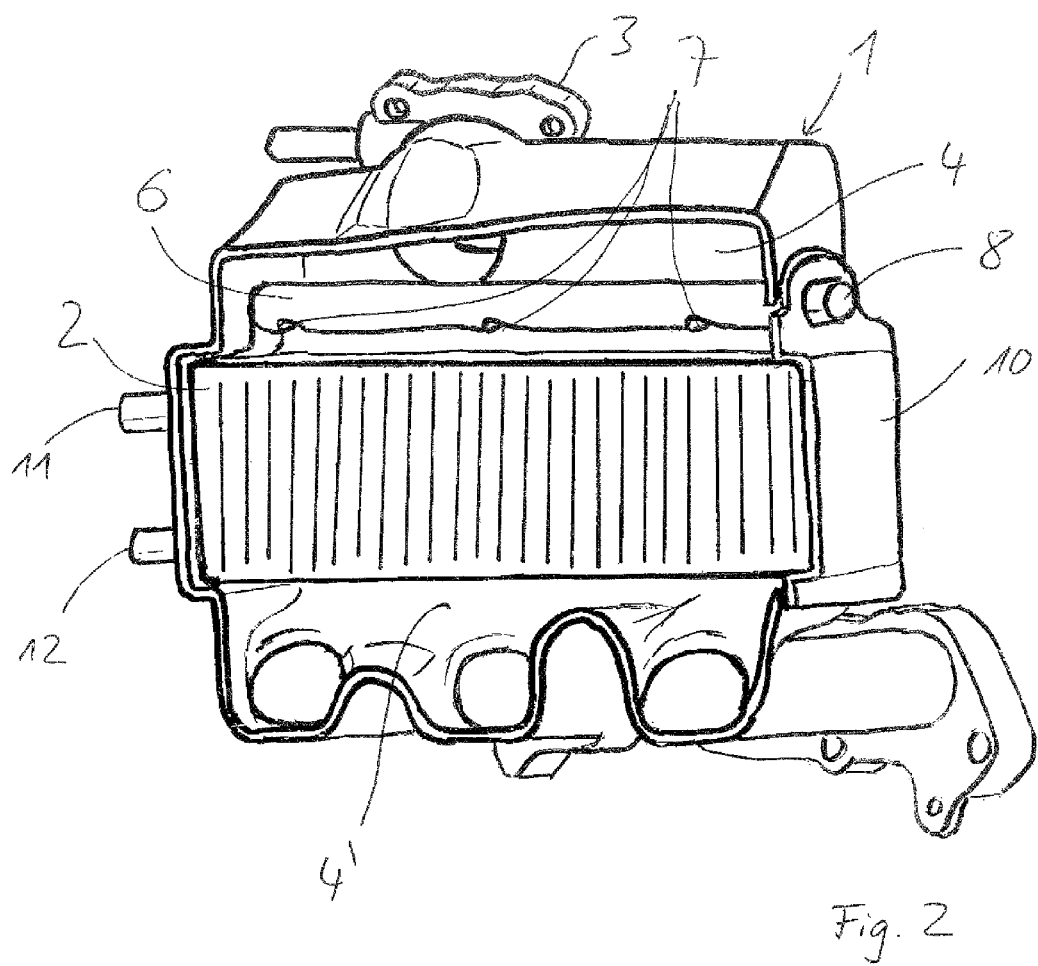
FIG. 2 shows a cross section through the intake manifold with a charge air cooler module arranged inside the plenum, consistent with the present invention.

FIG. 2 shows a cross section through the intake manifold 1 with a charge air cooler module 10 positioned inside the plenum 4. The air flows from the inlet flange 3 through the charge air cooler into the inlet ports 5 of the internal combustion engine.

The water circulates from the inlet 11 on the outside of the module through the charge air cooler to the outlet 2. Upstream of the air cooler 2 the charge air is mixed with the exhaust gas in a region between the charge air cooler 2 and the EGR inlet device 6. The EGR inlet device 6 has outlets 7 directed towards the cooler. The EGR inlet device 6 is surrounded by the air entering the manifold 1.

FIG. 3 shows a cross section through another embodiment of the EGR inlet device in an air intake line. The air flow from the turbo charger enters a first plenum 14 through an air inlet 13 and passes through the charge air cooler 22 before entering a second plenum 14' upstream the air outlet 15 towards the combustion engine.

Inside the plenum there is an EGR inlet device 16 positioned upstream before the cooler 22 with EGR outlet ports 17. The charge air cooler is passed through by water entering the charge air cooler module 10 by an inlet port 11 and leaving at an outlet port 12. The housing of the intake duct or line is made of plastic material, the plastic material in this and other embodiments is preferably a polyamide 6,6 or in another alternative polyamide 6, both preferably including glass fibers.

FIG. 4 depicts a side view of the module shown in FIG. 3 is shown. The exhaust gas EGR enters the EGR inlet device 6 at the inlet port 8. The EGR device 6 has a ring structure with several outlet ports 7 distributed at the ring adjacent to the cooler 22. The exhaust gas enters the central region at the inlet of the charge air cooler 22, spatially isolated from the plastic plenum 14 and inlet duct 13.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. An air intake tract delivering combustion air from a turbocharger to an engine, comprising:
   at least one of an air intake manifold and an air intake duct receiving a stream of combustion air from said turbocharger;
   wherein at least a portion of said intake manifold and/or said intake duct is made of plastic material;
   a charge air cooler module arranged at an interior of said air intake manifold, said charge air cooler module comprising
      a charge air cooler including
         a charge air cooler coolant inlet port;
         a charge air cooler coolant outlet port;
         an air inlet configured to receive said stream of combustion air from said turbocharger;
      a cooled flange integrated with said charge air cooler as unitary one-piece charge air cooler module, said cooled flange cooled by said charge air cooler, said cooled flange arranged on an exterior of said air intake manifold;
      an EGR inlet port integrated with said charge air cooler, said EGR inlet port extending through said cooled flange from an exterior of said air intake tract into said interior of said air intake manifold;
      an EGR inlet device arranged in the charge air cooler module and upstream of and proximate to the air inlet of the charge air cooler, said EGR inlet device including:
         at least one EGR outlet port positioned within the said intake tract, said EGR outlet ports configured to inject and mix exhaust gas with said combustion intake air in said intake tract;
      wherein said at least one EGR outlet port direct exhaust gas towards said air inlet of said charge air cooler;
      wherein said EGR inlet port is connected to said EGR inlet device, said EGR inlet port delivering exhaust gas to said EGR inlet device;
      wherein said at least one EGR outlet port is
   configured to inject and mix exhaust gas with said combustion intake air in said intake tract before entering the charge air cooler;
   wherein said charge air cooler is positioned downstream from said EGR inlet device and EGR outlet ports and positioned to receive said exhaust gas and intake air mixture.

2. The air intake tract of claim 1, wherein
   said charge air cooler and said cooled flange and said EGR device comprise said unitary one-piece charge air cooler module.

3. The air intake tract of claim 1, wherein
said EGR inlet device is configured to inject exhaust gas at a central portion of said charge air cooler inlet, said injection at said central portion spatially isolating uncooled exhaust gases from said plastic material of said intake tract.

4. The air intake tract of claim 3, wherein
said at least one EGR outlet port is a plurality of EGR outlet ports;

wherein said EGR inlet device has a ring structure with said plurality of EGR outlet ports distributed along said ring injecting exhaust gas at said central portion of said charge air cooler inlet.

5. The air intake tract of claim 1, wherein
said air intake tract includes an opening through which said charge air cooler module is inserted into air intake tract;

wherein, after said insertion, said cooling flange closes said opening in said air intake tract.

\* \* \* \* \*